United States Patent [19]

Blomquist et al.

[11] Patent Number: 4,905,863
[45] Date of Patent: Mar. 6, 1990

[54] VENT FOR PORTABLE GAS TANK OR THE LIKE

[75] Inventors: James E. Blomquist, Cedarburg; Barry S. Simon, Wauwatosa, both of Wis.

[73] Assignee: Kelch Corp., Cedarburg, Wis.

[21] Appl. No.: 204,466

[22] Filed: Jun. 9, 1988

[51] Int. Cl.[4] .................. B65D 51/16; B65D 55/16
[52] U.S. Cl. ................... 220/367; 220/375; 220/231; 251/276
[58] Field of Search ............... 220/303, 367, 375, 374, 220/231; 251/216

[56] References Cited

U.S. PATENT DOCUMENTS

| 193,015 | 7/1877 | McCarthy | 220/375 |
| 385,256 | 6/1888 | Eggers | 220/375 |
| 733,438 | 7/1903 | Tatum | 220/375 |
| 2,784,865 | 3/1957 | Rieke | 220/303 |
| 3,454,182 | 7/1969 | Morton | 220/374 |
| 3,910,572 | 10/1975 | Denler | 251/216 |
| 4,113,138 | 9/1978 | Fields | 220/375 |

FOREIGN PATENT DOCUMENTS

| 1253868 | 1/1961 | France | 220/375 |
| 2580595 | 10/1986 | France | 220/375 |
| 271267 | 5/1927 | United Kingdom | 220/375 |

OTHER PUBLICATIONS

Drawings of a first type of screw vent manufactured and sold by Kelch Corp.
Drawing of a second type of screw vent manufactured and sold by Kelch Corp.
Drawing of an alternate type of crystal manufactured and sold by Kelch Corp.

Primary Examiner—George E. Lowrance
Attorney, Agent, or Firm—Quarles & Brady

[57] ABSTRACT

An improvement in manually operable vents includes a pair of barbs positioned on the end of a leg attached to a vent screw. A vent body is formed with a retaining well on its underside facing the barbs. A throat is formed in the vent body, opening into a flat upper surface of the retaining well. During assembly, the vent screw is screwed into the vent body, causing the barbs to deflect inwards as they are urged through the throat. Once clear of the throat, the barbs restore to their normal position. The vent screw is then held captive, if removal is attempted, by the barbs wedging against the flat upper surface and a cylindrical side wall of the retaining well.

7 Claims, 1 Drawing Sheet

U.S. Patent  Mar. 6, 1990  4,905,863
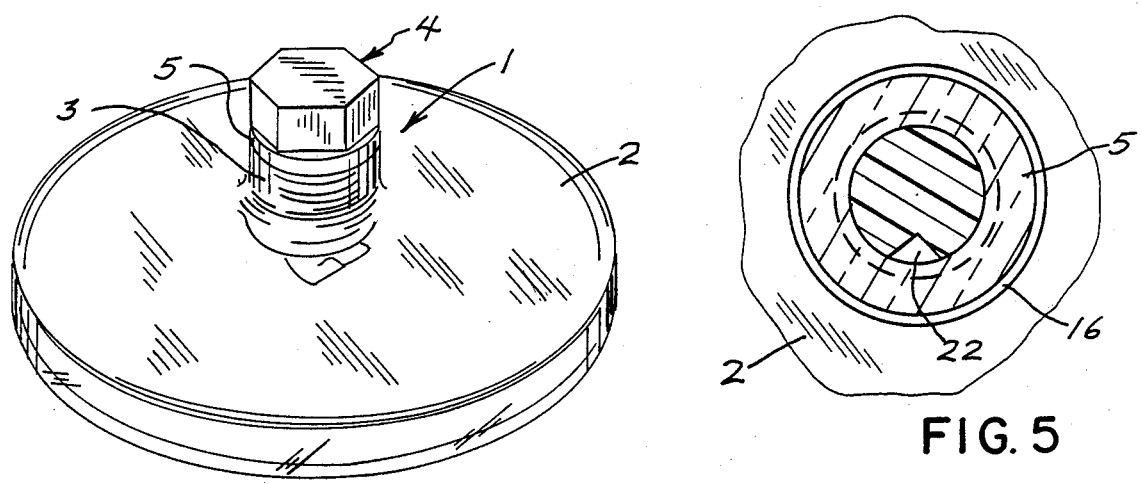
FIG. 1
FIG. 5
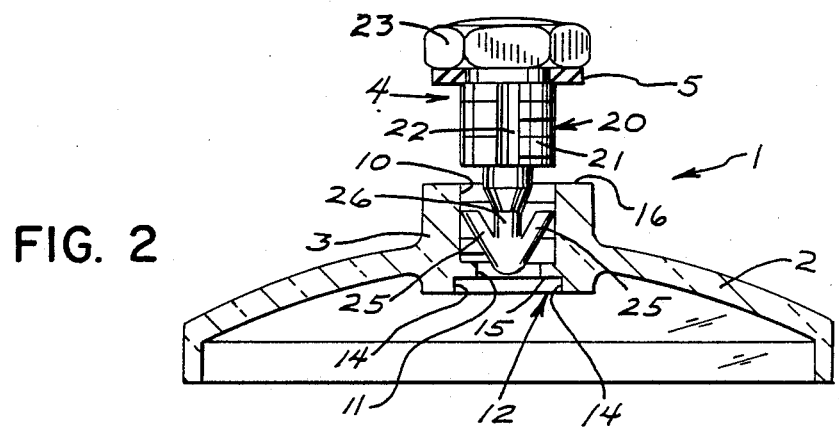
FIG. 2
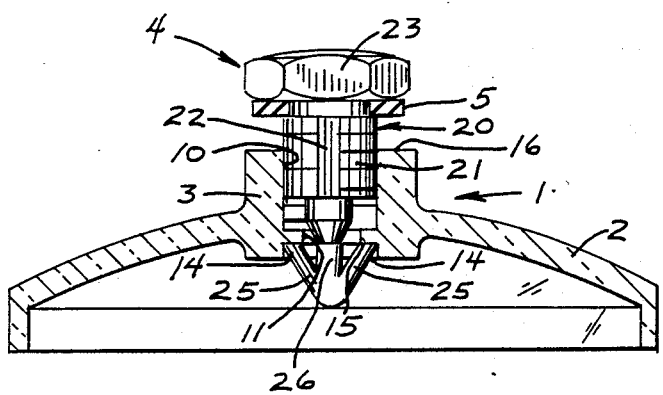
FIG. 3
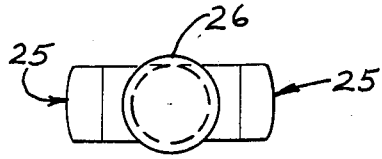
FIG. 6
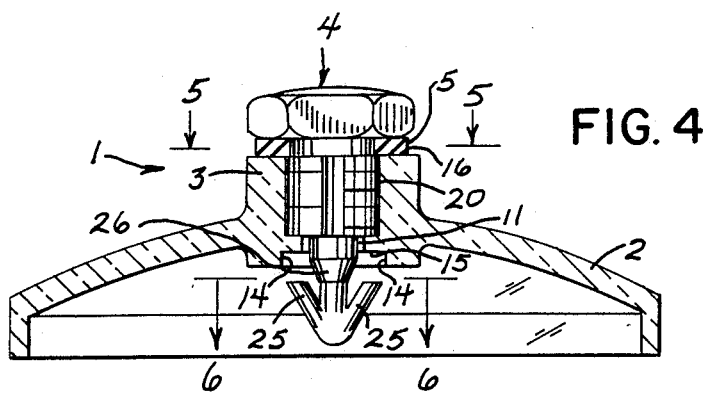
FIG. 4

VENT FOR PORTABLE GAS TANK OR THE LIKE

BACKGROUND OF THE INVENTION

The field of the invention is manually operable vents for closable containers.

Fuel tanks, fuel storage cans, or the like, require venting to allow gas to escape from the container when excess pressure builds up, and to allow air to enter the tank under negative pressure conditions. For some storage tanks, it is desirable to have the container completely sealed while not in use to prevent evaporation of the contents, to stop contaminants from entering, and to reduce the risk of spillage. However, even with such tanks, it is still desirable to permit venting at selected times (e.g. during the filling or emptying of the tank).

Some valves which permit this type of venting control do exist. However, it is desired to improve these values. Goals to be simultaneously achieved by such an improved valve are reducing the likelihood of the closure member becoming lost, reducing the likelihood of breakage of the closure member, reducing spillage potential, making reclosure easier, and avoiding the need for a complex and expensive construction.

SUMMARY OF THE INVENTION

In one embodiment, the invention provides a vent assembly for a container or the like. There is a housing having an outer surface, an inner surface, and a throughbore therebetween. The housing also has a valve seat at the outer surface, threads positioned adjacent the throughbore, and a retaining well formed along said throughbore. The well is defined by a top wall, a hole in the top wall, and side walls.

A vent screw is provided which has a head positionable outward of the valve seat, a threaded body portion positionable in the throughbore and suitable to mate with the housing threads, and a leg portion adjacent the threaded body portion inward of the head. The leg has a laterally extending foot capable of being flexed to permit the foot to readily pass inwardly through the well hole, with the foot then returning to a normal position so as to inhibit removal of the foot outward back through the well hole.

In a preferred form, a well side wall restricts the flexing of the foot when the screw is being unscrewed from the housing and the well top wall assists in trapping the foot. Also, the vent screw can be assembled to the housing by passing the foot through the well hole while rotating the screw. When the screw is assembled to the housing with the foot below the well top wall, the housing threads and screw threads will always be in threaded mating engagement.

In an especially preferred form, the foot comprises two flexible arrow-like barbs disposed at opposite lateral sides of the leg and the screw threaded body portion has an axial channel which permits venting along the channel when the screw head is in an open position relative to the valve seat. The housing can be formed integrally with the container or can be part of a cover which is formed separately from the container. Also, a washer can be positioned under the screw head and around the screw body portion so as to seal against the valve seat.

Several advantages result from the above structures. The screw and housing can be easily assembled. Once assembled, the screw cannot easily be removed from the housing (and thus become lost). Also, only two parts are needed for the assembly. Further, the retaining well provides a positive blind stop for the unscrewing of the screw (thus reducing the risk of breakage of the barbs). Moreover, spillage potential is reduced, the risk of breaking off the screw head is reduced, and reclosure of the vent is easier, all because the housing and screw threads are always mated together once the parts are assembled.

The objects of the invention therefore include:

(a) providing a vent assembly having the above advantages;

(b) providing a vent assembly of the above kind which is inexpensive to produce and reliable in operation; and (c) providing a vent assembly of the above kind suitable to be incorporated in a separate cover element or as part of a container wall.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

BRIEF DESCRIPTION OF THE DRAWINGS

FIG. 1 is a perspective view of a crystal for a container cover which incorporates a vent of the present invention;

FIG. 2 is a sectional view of the vent of FIG. 1, showing the vent screw inserted, but not assembled to the vent body;

FIG. 3 is a view similar to the view of FIG. 2, but showing the vent screw assembled with the vent body in the "venting" position;

FIG. 4 is a view similar to the view of FIG. 2, but showing the vent screw assembled with the vent body in the "closed" position;

FIG. 5 is a sectional view taken on line 5—5 of FIG. 4; and

FIG. 6 is a sectional view taken on line 6—6 of FIG. 4.

DESCRIPTION OF THE PREFERRED EMBODIMENT

Referring to FIG. 1, a vent assembly 1 according to the present invention preferably comprises a crystal housing 2 and a vent screw 4. The crystal 2 may form a part of a removable cap (not shown) utilized, for example, as a fuel tank cover. Alternatively, the housing structure may be formed integrally with a container (not shown).

Referring to FIG. 2, the housing has a cylindrical body portion 3. A resilient washer 5 is positioned under screw head 23. The interior of the body portion 3 is a hollow throughbore with female 15/16 inch by 18 pitch threads 10. Below the threads 10, a throat 11 is formed with a reduced diameter relative to the threaded portion 10. Below the throat 11, a retaining well is formed having a vertical cylindrical side wall 14 and a flat upper surface 15. The vent screw 4 includes a threaded body 20 formed with 5/16 inch by 18 pitch male threads 21. A longitudinal groove 22 (see FIG. 5) is cut through the threads 21 to allow the passage of gasses when the vent 1 is open. The body 20 is attached to a top head 23.

The head 23 is approximately ⅛ inch thick and is twelve sided, with approximately ⅝ inch between opposite sides. The twelve sided top member 23 allows easy fingertip grasp. The resilient washer 5 is placed around the body 20 against the underside of the top member 23. As will be clear from the descriptions below, when the body 20 is fully engaged into the vent body 3, the resilient washer 5 forms a seal between the underside of the top member 23 and a seat 16 formed on the upper surface of the vent body 3.

The vent screw 4 also includes a pair of barb-like feet 25 on the end of a leg 26 extending down from the body 20. The barbs 25 are resiliently deformable inwards towards the leg 26. While this could be accomplished in many ways within the scope of this invention, in this embodiment the entire vent screw 4 is formed of a stiff but pliable plastic material.

Referring specifically to FIG. 2, the vent 1 is assembled by inserting the vent screw 4, barbs 25 first, into the bore of the vent body 3. The length of the leg 26 is such that when the threads 21 on the vent screw 4 first engage the vent body 3, the barbs 25 have not yet engaged the throat 11. After inserting the vent screw 4 up to that point, threads 21 are engaged with threads 10, and the vent screw 4 is screwed in. As the vent screw 4 is being screwed in, the barbs 25 are forced through the throat 11 by the downward force imparted through leg 26.

Referring to FIG. 6, the barbs 25 have a curved outer surface 27 conforming to the curvature of the throat 11. Further, the barbs 25 are angled at approximately 30° with respect to the axis of leg 26. Because of this acute angle, as the barbs 25 are forced ever downward through the throat 11, the outer surface of the barbs 25 smoothly follows the wall of throat 11 and causes the barbs 25 to deflect inward towards leg 26. The vent screw 4 can thereby continue to be screwed in with only moderate resistance.

Eventually, the barbs 25 clear the throat 11 at the position shown in FIG. 3. At that point, the barbs 25 abruptly snap back to their normal, unflexed position. As will be described below, the vent screw 4 is then captive in the vent body 3.

In the position of FIG. 3, the vent 1 is open. The groove 22 is exposed to both the interior and exterior of the vent body 3. The interior of the vent body 3 further communicates with the interior of the tank (not shown), allowing the free exchange of gasses therebetween. To close the vent 1, the vent screw 4 is screwed in fully to the position shown in FIG. 4. At that point, the top member 23 seals the resilient washer 5 against seat 16 on the vent body 3. The groove 22 is thereby isolated from the external atmosphere, as shown in FIG. 5.

Then, the vent can be opened again by unscrewing the vent screw 4. Merely "cracking" the vent screw 4 away from the seat 16 is enough to open the vent 1. Continued unscrewing of the vent screw 4 provides some marginal increase of the vent opening. However, it is desired to prevent the complete removal of the vent screw 4, as it might then be inadvertently lost or damaged. Also, unscrewing too far might crack off barbs 25. The present invention by the unique retaining well construction described herein accomplishes this in an easily manufactured and assembled manner, without additional parts or manufacturing steps.

Referring again to FIG. 3, as the vent screw 4 continues to be unscrewed, the barbs 25 eventually contact the upper surface 15 of the retaining well 12. If, at that point, further unscrewing of the vent screw 4 is attempted, the barbs 25 will be urged outwards against the side walls 14 of the retaining well 12 by the outwardly directed component of the vector force acting on the barbs 25. The side wall 14 prevents the further outward spreading of the barbs 25, and so the barbs 25 are wedged solidly in the retaining well 12. An increased torque attempting to unscrew the vent screw 4 only wedges the barbs 25 even tighter in the retaining well 12.

As mentioned above, the angle of the barbs 25 with respect to the axis of leg 26 is acute to allow easy passage through the throat 11 during insertion. The same acute angle also has the effect that when the barbs 25 are wedged in the retaining well 12, the force on the barbs 25 is primarily compressive, since they are restrained from deflecting by the retaining well 12. As a result, the barbs 25 present such a great resistance that further withdrawal cannot be easily accomplished manually, e.g. by fingertips.

Note also that in the maximum open position, the vent screw 4 is still threaded into the bore of vent body 3. This minimizes the likelihood of the vent screw 4 being broken off. Further, it makes reclosure easier and lowers the risk of spillage.

It should be apparent to those skilled in the art that numerous modifications to the above described preferred embodiment are possible within the scope of this invention. For example, although the embodiment herein is described as having a generally vertical orientation, it should be apparent that the orientation could be angled otherwise.

We claim:

1. A vent assembly for a container or the like, comprising:
   a housing having an outer surface, an inner surface, and a throughbore therebetween, and:
   (a) a valve seat at said outer surface;
   (b) threads positioned adjacent said throughbore; and
   (c) a retaining well formed along said throughbore and adjacent to said inner surface, the well being defined by a top wall, a hole in the top wall open to said throughbore, and a side wall; and
   (d) a head positionable outward of the valve seat;
   (e) a threaded body portion positionable in the throughbore and suitable to mate with the housing threads;
   (f) a leg portion adjacent the threaded body portion and inward of the head, the leg having a foot extending laterally away from the leg and upwardly towards the head, and being capable of being flexed to permit the foot to readily pass inwardly through the well hole, with the foot then returning to a normal position; and
   (g) means for deflecting the foot outwardly into contact with the side wall of the well upon attempted removal of the vent screw outward back through the vent hole, thereby inhibiting removal of the vent screw.

2. The vent assembly of claim 1, wherein when the vent screw is assembled to the housing, the threaded portion of the vent screw engages the threads in the housing before foot passes completely through the well hole.

3. The vent assembly of claim 1, wherein the foot comprises two flexible barbs disposed at opposite lateral sides of the leg.

4. The vent assembly of claim 1, wherein the threaded body portion of the vent screw has an axial channel which permits venting along the channel when the screw head is in an open position relative to the valve seat.

5. The vent assembly of claim 1, wherein the housing is formed integrally with the container.

6. The vent assembly of claim 1, wherein the housing is part of a cover which is separately formed from the container.

7. The vent assembly of claim 1, wherein a washer is positioned under the screw head and around the threaded body portion so as to be capable of sealing against the valve seat.

* * * * *